United States Patent
Arimoto

[11] Patent Number: 5,185,678
[45] Date of Patent: Feb. 9, 1993

[54] COMPACT HIGH RATIO ZOOM LENS SYSTEM

[75] Inventor: Tetsuya Arimoto, Osaka, Japan

[73] Assignee: Minolta Camera Kabushiki Kaisha, Osaka, Japan

[21] Appl. No.: 728,207

[22] Filed: Jul. 10, 1991

[30] Foreign Application Priority Data

Jul. 11, 1990 [JP] Japan .................. 2-184661
Jul. 11, 1990 [JP] Japan .................. 2-184662
Jul. 11, 1990 [JP] Japan .................. 2-184663

[51] Int. Cl.$^5$ ............................. G02B 15/16
[52] U.S. Cl. ..................... 359/683; 359/684
[58] Field of Search .............. 359/683, 684, 676

[56] References Cited

U.S. PATENT DOCUMENTS

| | | | |
|---|---|---|---|
| 4,380,377 | 4/1983 | Sato et al. ............ | 359/683 |
| 4,789,229 | 12/1988 | Yamanashi ............. | 359/683 |
| 4,842,385 | 6/1989 | Tanaka . | |
| 5,042,927 | 8/1991 | Ogawa et al. .......... | 359/683 |

FOREIGN PATENT DOCUMENTS

| | | |
|---|---|---|
| 56-165107 | 5/1980 | Japan . |
| 606914 | 6/1983 | Japan . |
| 62-209508 | 3/1986 | Japan . |
| 63-189819 | 2/1987 | Japan . |
| 63-195618 | 2/1987 | Japan . |
| 63-208015 | 2/1987 | Japan . |
| 63-221312 | 3/1987 | Japan . |
| 63-7013 | 6/1987 | Japan . |
| 647012 | 6/1987 | Japan . |

Primary Examiner—Janice A. Howell
Assistant Examiner—Richard Hanig
Attorney, Agent, or Firm—Price, Gess & Ubell

[57] ABSTRACT

A zoom lens system comprises from the object side, a first lens unit of positive refractive power, a second lens unit of negative refractive power, a third lens unit of positive refractive power, a fourth lens unit of positive refractive power, and a fifth lens unit of negative refractive power. The first, third and fourth lens units move towards the object side in a zooming operation from the shortest focal length condition to the longest focal length condition. Further, the zoom lens system fulfills the following conditions:

$$0.4 < |f_2|/f_W < 0.5$$

$$1.0 < |f_5|/f_4 < 5.0$$

$$2.5 < e_{3T}/e_{3W} < 4.5$$

wherein $f_2$ represents a focal length of the second lens unit, $f_W$ represents a focal length of the whole zoom lens system in the shortest focal length condition, $f_5$ represents a focal length of the fifth lens unit, $f_4$ represents a focal length of the fourth lens unit, $e_{3T}$ represents an axial distance between the third and fourth lens units in the longest focal length condition, and $e_{3W}$ represents an axial distance between the third and fourth lens units in the shortest focal length condition.

21 Claims, 9 Drawing Sheets

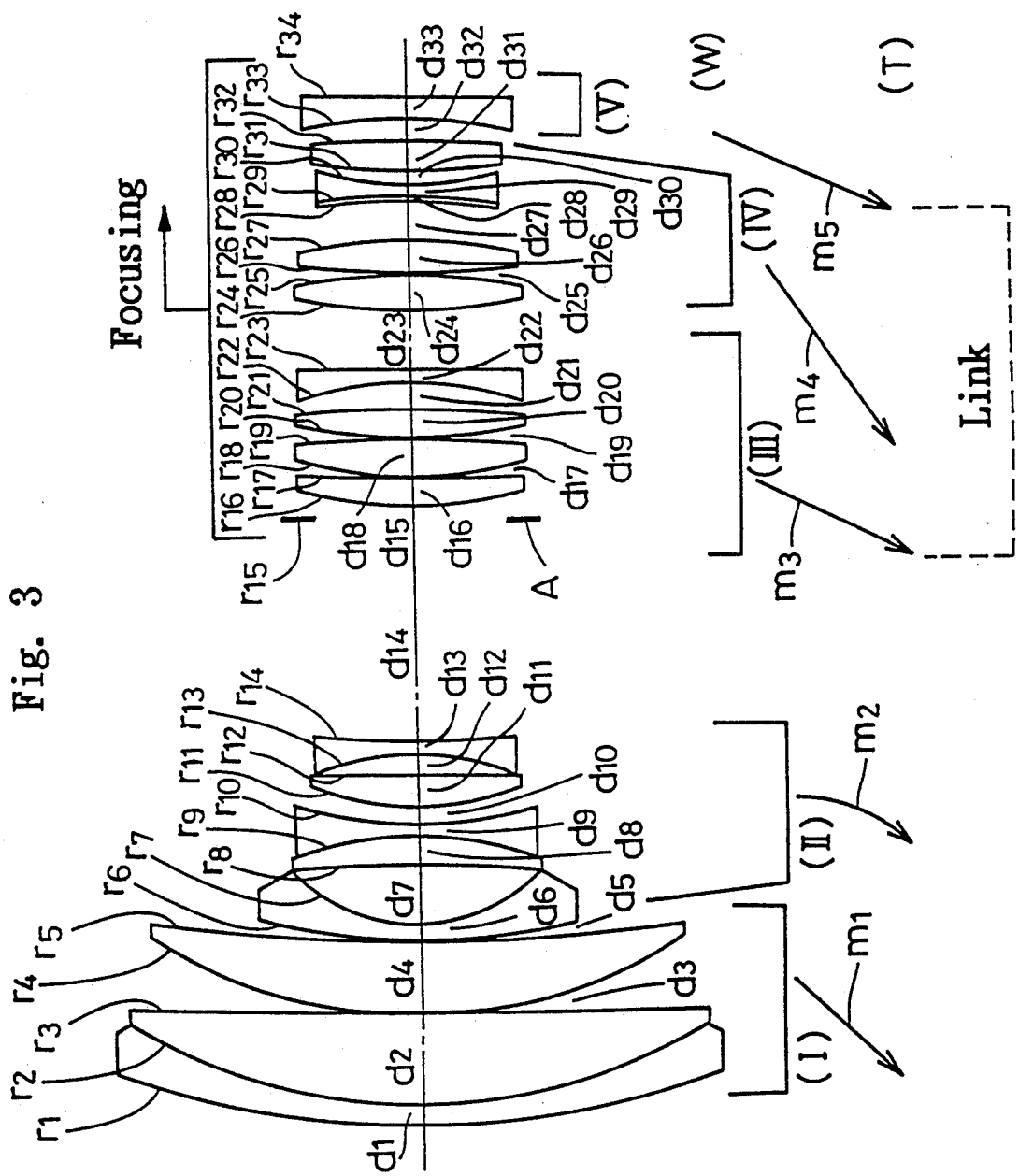

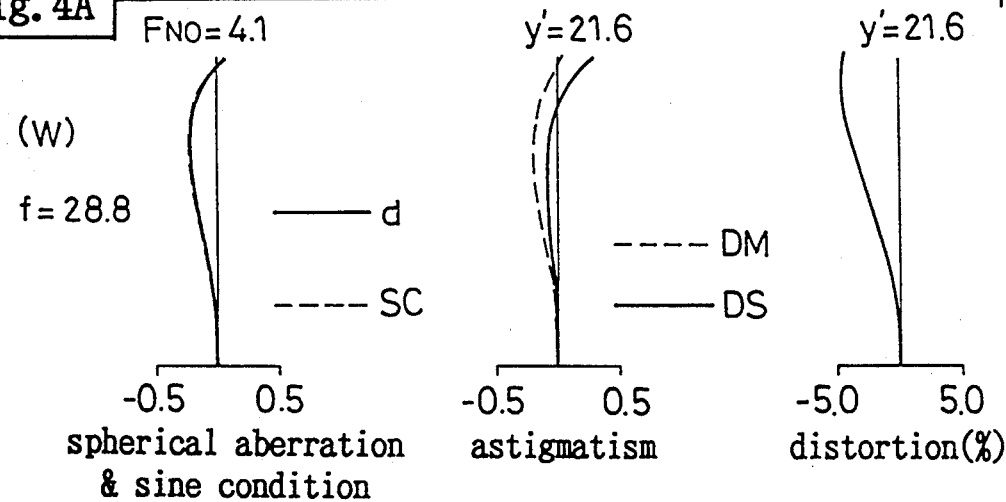
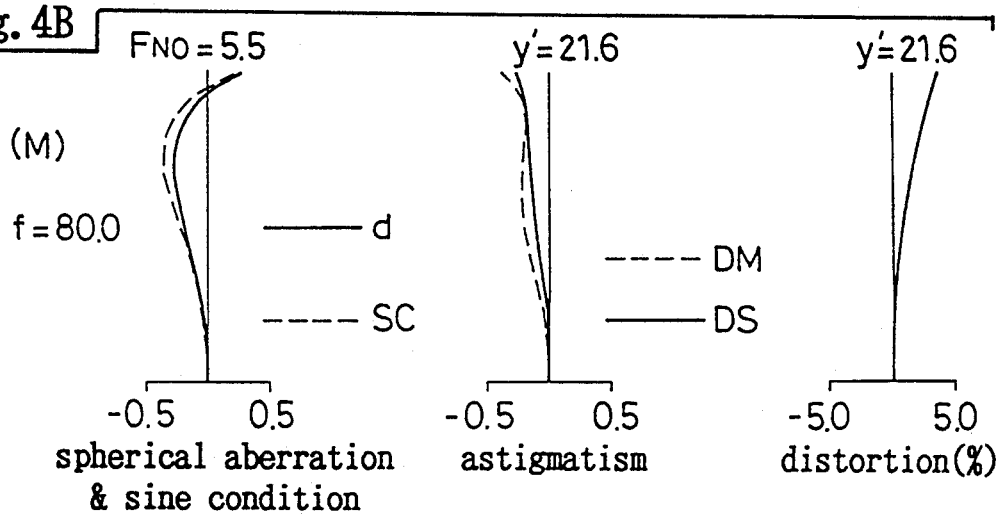
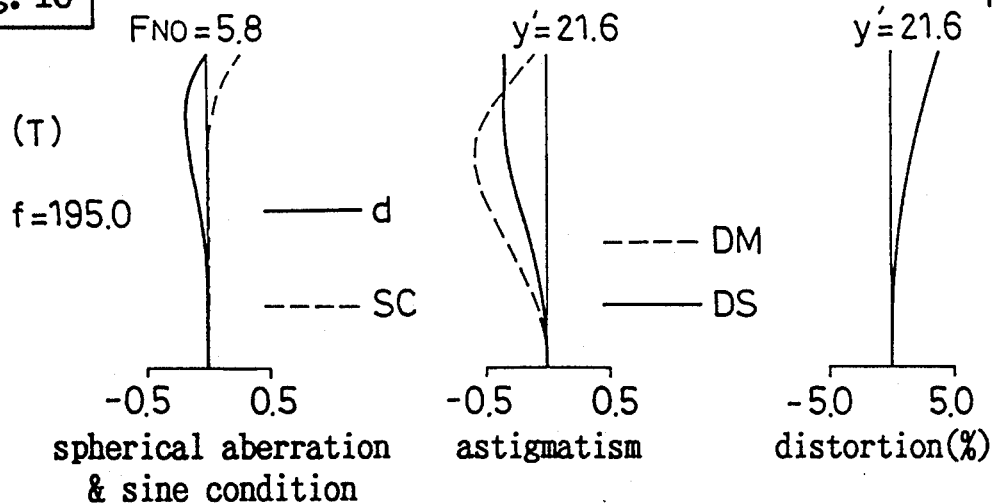

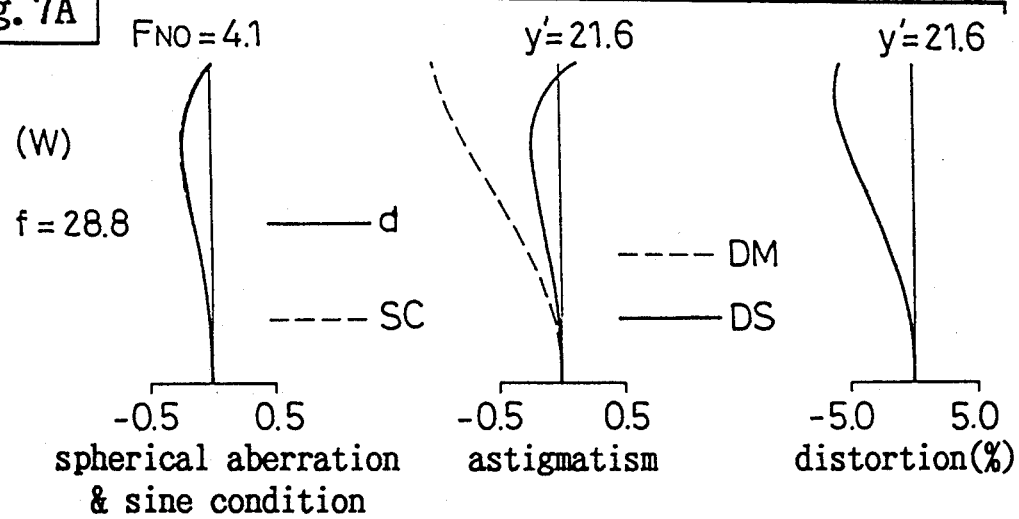
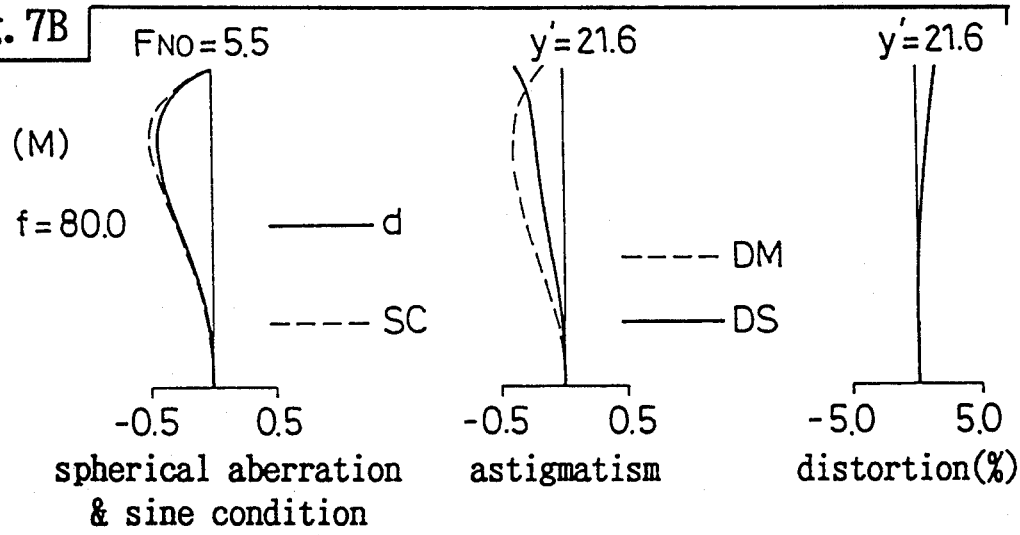
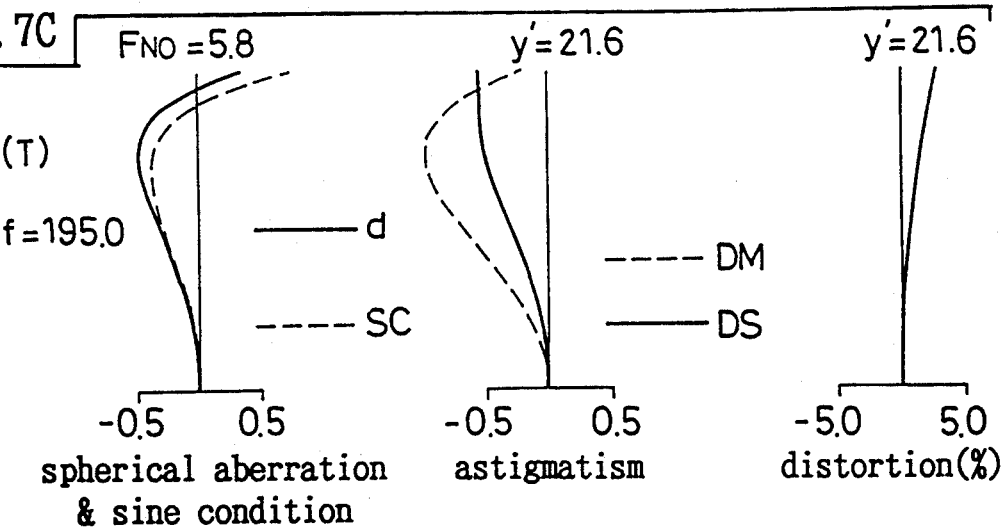

Fig. 8A (W) f = 36.0

- FNO = 4.1, spherical aberration & sine condition (−0.5 to 0.5); d, SC
- y' = 21.6, astigmatism (−0.5 to 0.5); DM, DS
- y' = 21.6, distortion (%) (−5.0 to 5.0)

Fig. 8B (M) f = 80.0

- FNO = 5.5, spherical aberration & sine condition (−0.5 to 0.5); d, SC
- y' = 21.6, astigmatism (−0.5 to 0.5); DM, DS
- y' = 21.6, distortion (%) (−5.0 to 5.0)

Fig. 8C (T) f = 195.0

- FNO = 5.8, spherical aberration & sine condition (−0.5 to 0.5); d, SC
- y' = 21.6, astigmatism (−0.5 to 0.5); DM, DS
- y' = 21.6, distortion (%) (−5.0 to 5.0)

COMPACT HIGH RATIO ZOOM LENS SYSTEM

BACKGROUND OF THE INVENTION

1. Field of the Invention

The present invention relates to a zoom lens system and more particular to a compact high ratio zoom lens system.

2. Description of the Prior Art

In recent years, zoom lens systems having higher zoom ratios have been proposed. Some of them have a zoom ratio of as high as approximately 6× to 7× (disclosed in U.S. Pat. No. 4,789,229, and Japanese laid-open Patent Applications Nos. 63-189819, 63-221312, 63-195618, 63-208015, 64-7012, etc.).

As the zoom ratio of zoom lens systems increases, however, it becomes more difficult to correct aberrations, which results in the increase in size of the zoom lens systems. Moreover, in a high-zoom-ratio zoom lens system, it is not easy to reduce the minimum object distance (the shortest object distance with which photographing can be performed) due to the difficulty in correcting aberrations and the increase in size of the front lens element.

SUMMARY OF THE INVENTION

An object of the present invention is to provide a high-zoom-ratio, compact zoom lens system while maintaining a high optical performance.

A further object of the present invention is to provide the above-described zoom lens system having a shorter minimum object distance.

To achieve the above-described objects, the present invention provides a zoom lens system comprising from the object side: a first lens unit of positive refractive power, and shiftable towards the object side in a zooming operation from a shortest focal length condition to a longest focal length condition; a second lens unit of negative refractive power; a third lens unit of positive refractive power, and shiftable towards the object side in the zooming operation from the shortest focal length condition to the longest focal length condition; a fourth lens unit of positive refractive power, and shiftable towards the object side in the zooming operation from the shortest focal length condition to the longest focal length condition; and a fifth lens unit of negative refractive power, and wherein the following conditions are fulfilled:

$$0.4 < |f_2|/f_w < 0.5$$

$$1.0 < |f_5|/f_4 < 5.0$$

$$2.5 < e_{3T}/e_{3W} < 4.5$$

wherein $f_2$ represents a focal length of the second lens unit, $f_w$ represents a focal length of the whole zoom lens system in the shortest focal length condition, $f_5$ represents a focal length of the fifth lens unit, $f_4$ represents a focal length of the fourth lens unit, $e_{3T}$ represents an axial distance between the third and fourth lens units in the longest focal length condition, and $e_{3W}$ represents an axial distance between the third and fourth lens units in the shortest focal length condition.

The present invention further provides a zoom lens system comprising from the object side: a first lens unit of positive refractive power, and shiftable towards the object side in a zooming operation from a shortest focal length condition to the longest focal length condition; a second lens unit of negative refractive power; a third lens unit of positive refractive power, and shiftable towards the object side in the zooming operation from the shortest focal length condition to the longest focal length condition; a fourth lens unit of positive refractive power, and shiftable towards the object side in the zooming operation from the shortest focal length condition to the longest focal length condition, the fourth lens unit being composed of from the object side, a positive lens element, a positive lens element, a negative biconcave lens element, and a positive lens element, and having at least one aspheric surface; and a fifth lens unit of negative refractive power.

The present invention still further provides a zoom lens system comprising from the object side: a first lens unit of positive refractive power, and shiftable towards the object side in a zooming operation from a shortest focal length condition to a longest focal length condition; a second lens unit of negative refractive power; a third lens unit of positive refractive power, and shiftable towards the object side in the zooming operation from the shortest focal length condition to the longest focal length condition; a fourth lens unit of positive refractive power, and shiftable towards the object side in the zooming operation from the shortest focal length condition to the longest focal length condition; and a fifth lens unit of negative refractive power; and wherein the third, fourth and fifth lens units are integrally shiftable towards the image side in a focusing operation from an infinity focusing condition to a nearest focusing condition.

The present invention even further provides a zoom lens system comprising from the object side: a first lens unit of positive refractive power, and shiftable towards the object side in a zooming operation from a shortest focal length condition to a longest focal length condition; a second lens unit of negative refractive power; a third lens unit of positive refractive power, and shiftable towards the object side in the zooming operation from the shortest focal length condition to the longest focal length condition; a fourth lens unit of positive refractive power, and shiftable towards the object side in the zooming operation from the shortest focal length condition to the longest focal length condition, the fourth lens unit being composed of from the object side, a positive lens element, a positive lens element, a negative biconcave lens element, and a positive lens element; and a fifth lens unit of negative refractive power; and wherein the third, fourth and fifth lens units are integrally shiftable towards the image side in a focusing operation from an infinity focusing condition to a nearest focusing condition.

BRIEF DESCRIPTION OF THE DRAWINGS

The features of the present invention which are believed to be novel are set forth with particularly in the appended claims. The present invention, both as to its organization and manner of operation, together with further objects and advantages thereof, may best be understood by reference to the following description, taken in conjunction with the accompanying drawings in which:

FIGS. 1, 2 and 3 are cross-sectional views of the optical systems of a first, second and third embodiments according to the present invention;

FIGS. 4A, 5A and 6A represent the curves of the aberrations, to the object point at infinity, of the first to third embodiments according to the present invention at the shortest focal length condition;

FIGS. 4B, 5B and 6B represent the curves of the aberrations, to the object point at infinity, of the first to third embodiments according to the present invention at the middle focal length condition;

FIGS. 4C, 5C and 6C represent the curves of the aberrations, to the object point at infinity, of the first to third embodiments according to the present invention at the longest focal length condition;

FIGS. 7A, 8A and 9A represent the curves of the aberrations, to the object point at the nearest position, of the first to third embodiments according to the present invention at the shortest focal length condition;

FIGS. 7B, 8B and 9B represent the curves of the aberrations, to the object point at the nearest position, of the first to third embodiments according to the present invention at the middle focal length condition; and FIGS. 7C, 8C and 9C represent the curves of the aberrations, to the object point at the nearest position, of the first to third embodiments according to the present invention at the longest focal length condition.

DETAILED DESCRIPTION OF THE PREFERRED EMBODIMENTS

Figure 1:
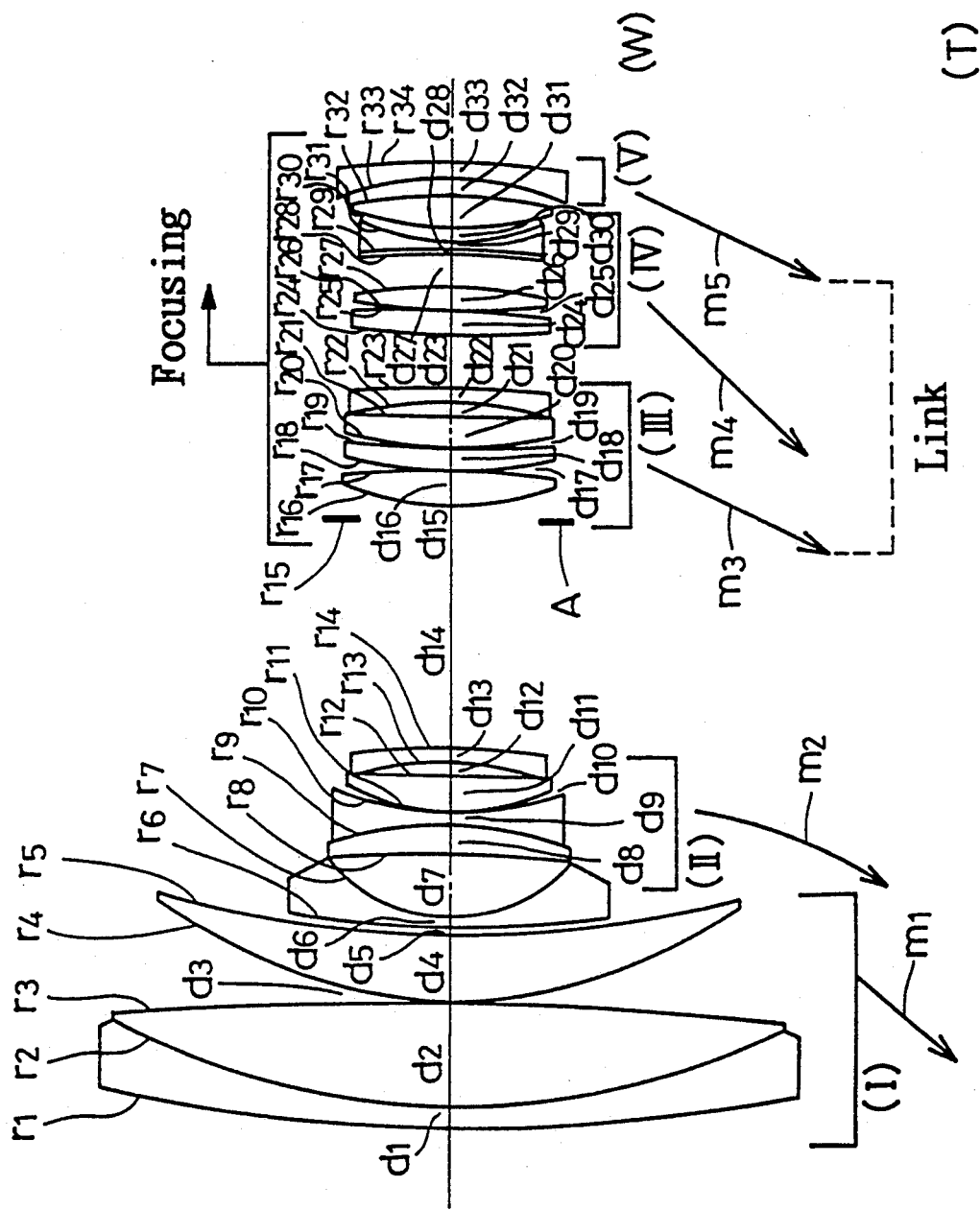

The following description is given to enable any person skilled in the optical and camera field to make and use the invention and sets forth the best modes contemplated by the inventor for carrying out his invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system.

In the drawings, schematic cross sectional views disclose the position of the lens units and lens elements for the shortest focal length with arrows below the lens units representing the directions of their movements for zooming toward the longest focal length. Due to the number of lens elements involved, it was not deemed appropriate to include individual designation of the radii of curvature and axial distances for each lens element and air space. These values, however, are provided in the accompanying tables set forth herein, and the schematic cross sectional views of the respective embodiments follow the normal conventions of an object at the left-hand side of the drawing and the image plane at the right-hand side.

The present invention provides a zoom lens system comprising, from the object side, a first lens unit of positive refractive power, a second lens unit of negative refractive power, a third lens unit of positive refractive power, a fourth lens unit of positive refractive power, and a fifth lens unit of negative refractive power, wherein the first, third and fourth lens units respectively move toward the object side in a zooming operation from a shortest to a longest focal length conditions, and the following conditions (1), (2) and (3) are fulfilled:

$$0.4 < |f_2|/f_W < 0.5 \tag{1}$$

$$1.0 < |f_5|/f_4 < 5.0 \tag{2}$$

$$2.5 < e_{3T}/e_{3W} < 4.5 \tag{3}$$

wherein:
$f_2$ represents a focal length of the second lens unit;
$f_W$ represents a focal length of the whole zoom lens system in the shortest focal length condition;
$f_5$ represents a focal length of the fifth lens unit;
$f_4$ represents a focal length of the fourth lens unit;
$e_{3T}$ represents an axial distance between the third and fourth lens units in the longest focal length condition; and
$e_{3W}$ represents an axial distance between the third and fourth lens units in the shortest focal length condition.

The second and fifth lens unit can be shiftable or stationery in a zooming operation.

In a five-unit zoom lens system having a positive, a negative, a positive, a positive and a negative lens units like the present embodiment, the second lens unit having a negative refractive power plays an important role in a zooming operation. The condition (1) stipulates the refractive power of the second lens unit.

When the lower limit of the condition (1) is exceeded, the refractive power of the second lens unit becomes excessive, which is not preferable in correcting aberrations. Especially spherical aberration tends to be overcorrected, and negative distortion increases in the shortest focal length condition. When the upper limit of the condition (1) is exceeded, the refractive power of the second lens unit decreases. Consequently, the shifting amount of the second lens unit in a zooming operation increases, which increases the size of the whole zoom lens system.

In the zoom lens systems according to the present invention, a lens unit of negative refractive power is arranged at the rearmost position to decrease the length of the whole zoom lens system. Furthermore, the zoom lens systems are constructed so that the relation between the focal lengths of the fourth and fifth lens units fulfills the condition (2), which enables a further reduction of the length of the whole zoom lens system. When the lower limit of the condition (2) is exceeded, the absolute value of the focal length of the fifth lens unit becomes excessively smaller than the focal length of the fourth lens unit. This interferes with the aberration correction, though being advantageous in obtaining a compactness. Especially, it becomes difficult to correct field curvature in a well-balanced condition. When the upper limit of the condition (2) is exceeded, it becomes impossible to reduce the length of the whole zoom lens system.

Further, in the zoom lens systems according to the present invention, the variation in field curvature in a zooming operation can be corrected by moving the third and fourth lens units to change the distance between them in a zooming operation. Besides, it is required to construct the zoom lens systems so that the condition (3) is fulfilled.

When the lower limit of the condition (3) is exceeded, it is impossible to secure a distance, between the third and fourth lens units, required for sufficiently correcting field curvature in the entire focal length range. When the upper limit of the condition (3) is exceeded, the total length of the zoom lens system increases.

Generally, in a zoom lens system, a focusing operation is carried out by shifting a front lens element. This is advantageous in that the shifting amount is constant irrespective of the zooming position; however, it is disadvantageous in that the minimum object distance cannot further be reduced when the image forming performance and image illumination are considered. That is, when the front lens element is shifted to the object side, off-axial luminous fluxes are eclipsed according to the shifting amount of the front lens element. As a result, the illumination decreases, making it impossible to reduce the minimum object distance. If the diameter of the front lens element is increased to prevent the eclipse of off-axial luminous fluxes, the size of the zoom lens system increases.

In the present invention, by constructing the zoom lens systems so that the third, fourth and fifth lens units integrally move toward the image side in a focusing operation from infinity to the near side (rear focusing), the above-described eclipse of off-axial luminous flux by the shifting of the front lens element is prevented, which enables the reduction of the minimum object distance. Moreover, with such construction, the shifting amount in a focusing operation can be reduced (especially in the shortest focal length condition), whereby a compact zoom lens system is realized. Further, the image illumination does not decrease even if the diameter of the front lens element is not increased, and spherical aberration and field curvature vary in the same direction in a focusing operation from infinity to the near side, which is advantageous in correcting aberrations. That is, in the above-described focusing operation where the front lens element is moved-out, spherical aberration and field curvature vary in the opposite directions when the focusing condition, where spherical aberration and field curvature are corrected for an object point at infinity, is changed to the focusing condition, where the above aberrations are corrected for an object point at a near point, in a focusing operation. On the contrary, with the above-described rear focusing by the third to fifth lens units, spherical aberration and field curvature vary in the same direction even in the above-described focusing operation where the focusing condition is changed. As a result, aberrations are effectively corrected, which is advantageous in reducing the minimum object distance.

When a focusing operation is performed with the third to fifth lens units as described above, it is preferable that the following condition is further fulfilled:

$$0.25 < |f_{3-5}|/(f_W \cdot f_T)^{\frac{1}{2}} < 0.37 \qquad (4)$$

wherein:
  $f_{3-5}$ represents a compound focal length of the third, fourth and fifth lens units; and
  $f_T$ represents a focal length of the whole zoom lens system at the longest focal length condition.

When the lower limit of the condition (4) is exceeded, the compound refractive power of the third, fourth and fifth lens units increase, so that spherical aberration is under-corrected. Especially, it becomes difficult to correct spherical aberration at the middle focal length condition. When the upper limit of the condition (4) is exceeded, the shifting amounts of the lens units in a focusing operation excessively increase, which prevents the realization of a satisfactory compactness. The zoom lens system which fulfills the condition (4) is most suitable for correcting field curvature and coma in the entire focal length range.

Now, the case where aspheric surfaces are employed for the present invention will be described. To improve the optical performance by excellently correcting aberrations in order to sufficiently achieve the objects of the present invention, it is preferable that at least one aspheric surface is employed for the fourth lens unit. This is because the fourth lens unit plays a decisive role in correcting spherical aberration and coma in the entire focal length range and also corrects field curvature by changing the axial distance between the third and fourth lens units.

The aspheric surfaces employed for the fourth lens unit preferably fulfill the following condition (5):

$$d\phi/dH < 0 \qquad (5),$$

wherein $d\phi/dH$ represents a partial deviation of refractive power at a height (a distance from an optical axis) H in an aspheric surface.

This indicates that the partial negative refractive power of an aspheric surface increases as the distance between the optical axis and the aspheric surface increases. The positive aberrations produced in the fourth unit having a positive refractive power (under-corrected spherical aberration and field curvature), which tend to become stronger as the distance between the aspheric surface and the optical axis increases, are restrained by fulfilling the condition (5).

Further, the zoom lens systems according to the present invention preferably fulfills the following condition (6):

$$4.0 < \{(\beta_W^2 - 1)/(\beta_T^2 - 1)\} \cdot Z^2 < 9.0 \qquad (6)$$

wherein:
  $\beta_W$ represents a compound magnification of the third, fourth and fifth lens units to an object at infinity in the shortest focal length condition;
  $\beta_T$ represents a compound magnification of the third, fourth and fifth lens units to an object at infinity at the longest focal length condition; and
  Z represents a zoom ratio defined as $Z = f_T/f_W$.

In the rear focusing system employed for the present invention, different shifting amounts are required for an object distance in a zooming operation. According to the present invention, by removing the restriction that the shifting amounts in a focusing operation should be constant, a high zoom-ratio and compactness are realized. However, if the actual product of the zoom lens systems is considered, it is more preferable in constructing lens barrels that the shifting amount in the short focal length condition and that in the long focal length condition do not largely differ. Moreover, when the difference among the shifting amounts in a zooming operation is electrically corrected, it is further more preferable in constructing lens barrels that the shifting amount in the short focal length condition and that in the long focal length condition do not largely differ.

In the present invention, the condition (6) stipulates the ratio of the shifting amounts as hereinafter described.

According to the rear focusing system employed for the present invention, it is known that the shifting amount X required for obtaining the in-focus condition with respect to an object distance D is approximately obtained by $$X = \{f^2/(\beta^2 - 1)\}/D$$

where $\beta$ represents a compound magnification of the third, fourth and fifth lens units to an object at infinity at a focal length f. Here, when the shifting amount at the focal length $f_W$ is $X_W$ and the shifting amount at the focal length $f_T$ is $X_T$, $$X_W = \{f_W^2/(\beta_W^2 - 1)\}/D$$

$$X_T = \{f_T^2/(\beta_T^2 - 1)\}/D.$$

Therefore, $$\begin{aligned}X_T/X_w &= \{f_T^2/(\beta_T^2 - 1)\}/\{f_w^2/(\beta_w^2 - 1)\}\\ &= [\{1/(\beta_T^2 - 1)\}/\{1/(\beta_w^2 - 1)\}]\{f_T/f_w\}^2\\ &= \{(\beta_w^2 - 1)/(\beta_T^2 - 1)\} \cdot Z^2.\end{aligned}$$

As described above, the condition (6) stipulates the ratio of the shifting amount with respect to an object distance in the shortest focal length condition to that in the longest focal length condition.

When the lower limit of the condition (6) is exceeded, although the above-mentioned ratio of the shifting amounts decreases, the advantages of the rear focusing system are not fully realized. That is, the degree of freedom, for realizing the most excellent arrangement with respect to the zoom characteristic, cannot be sufficiently utilized, so that it becomes difficult to realize a high zoom ratio, a compactness and the reduction of the minimum object distance in a well-balanced condition.

When the upper limit of the condition (6) is exceeded, the lens barrel cannot be satisfactorily arranged as described above. At least, the zoom lens system therein is not suitable for a rear focusing system.

Figure 2:
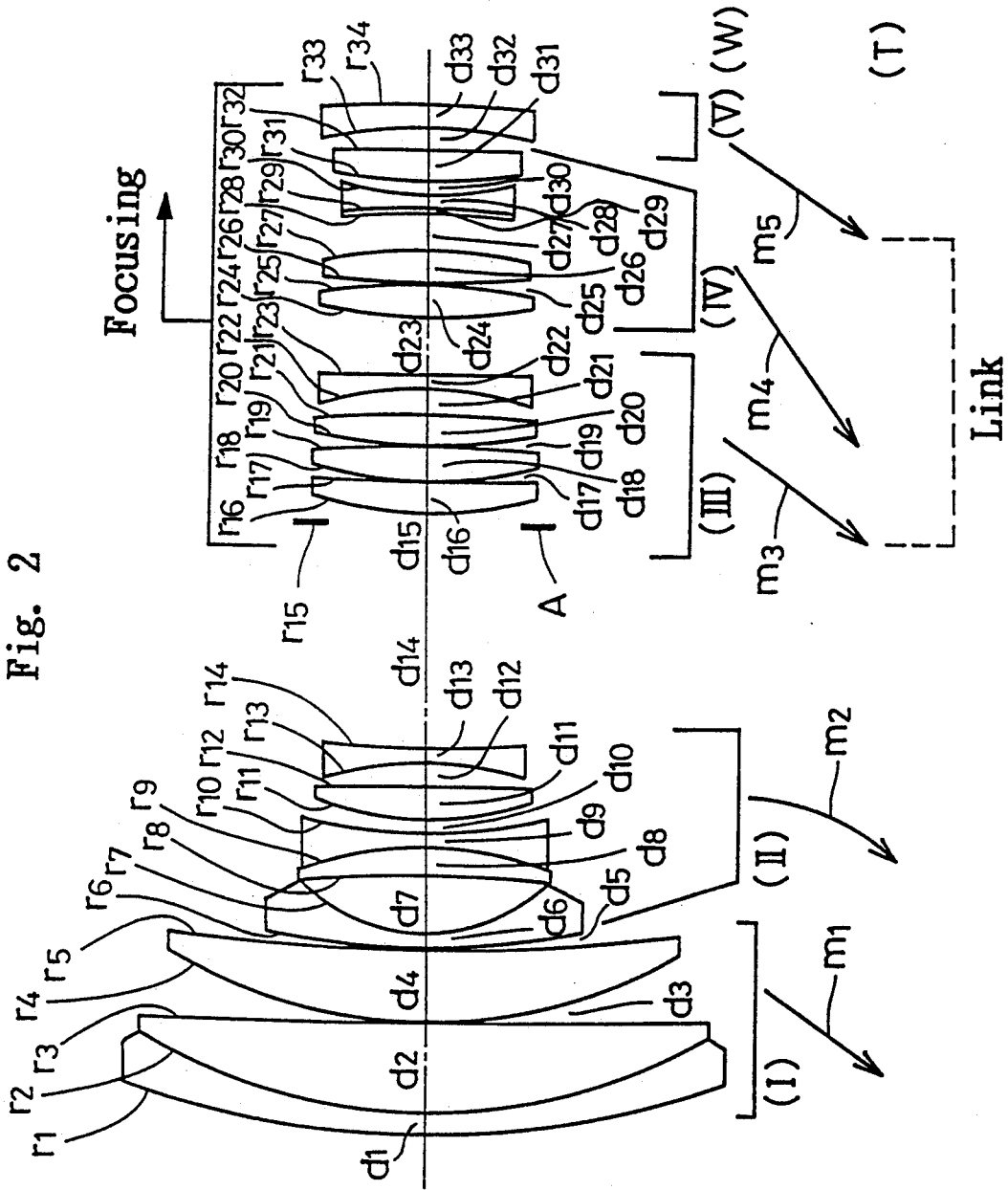
Figure 5A:
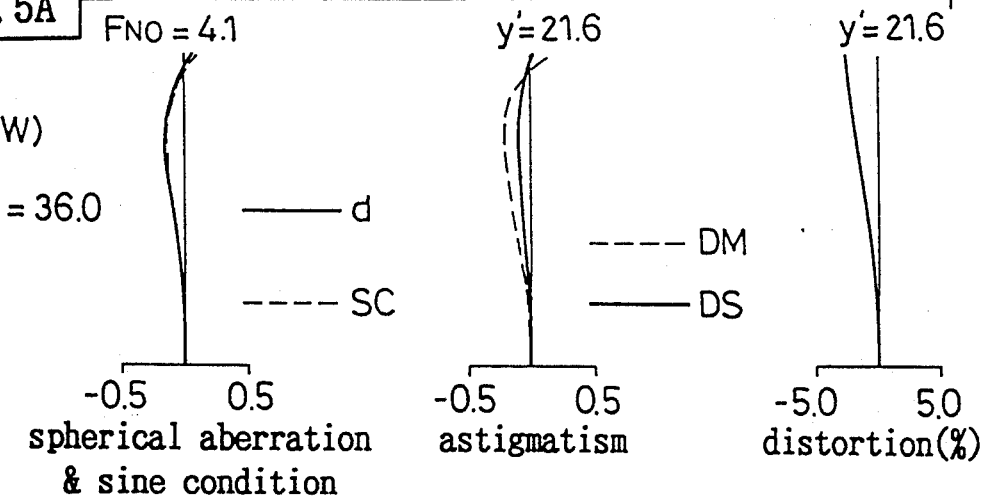
Figure 5B:
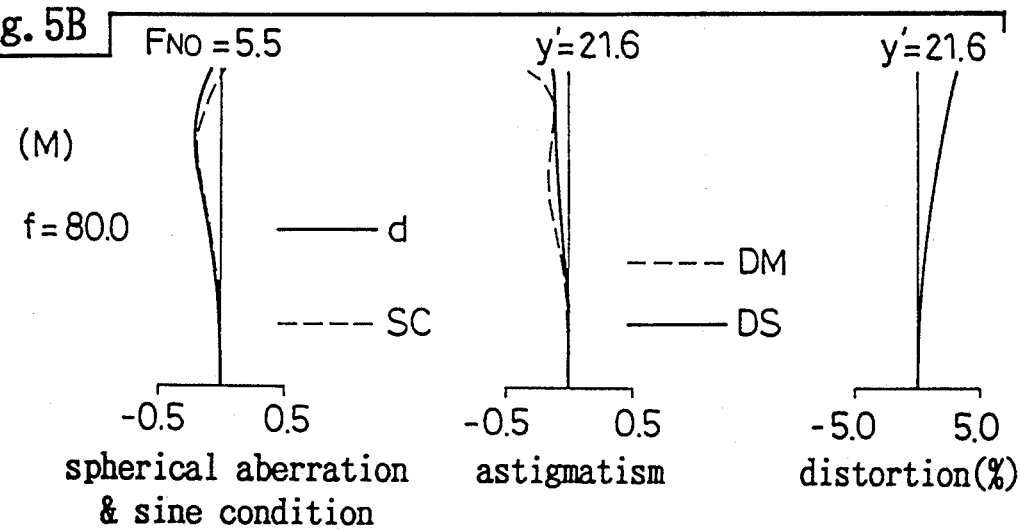
Figure 5C:
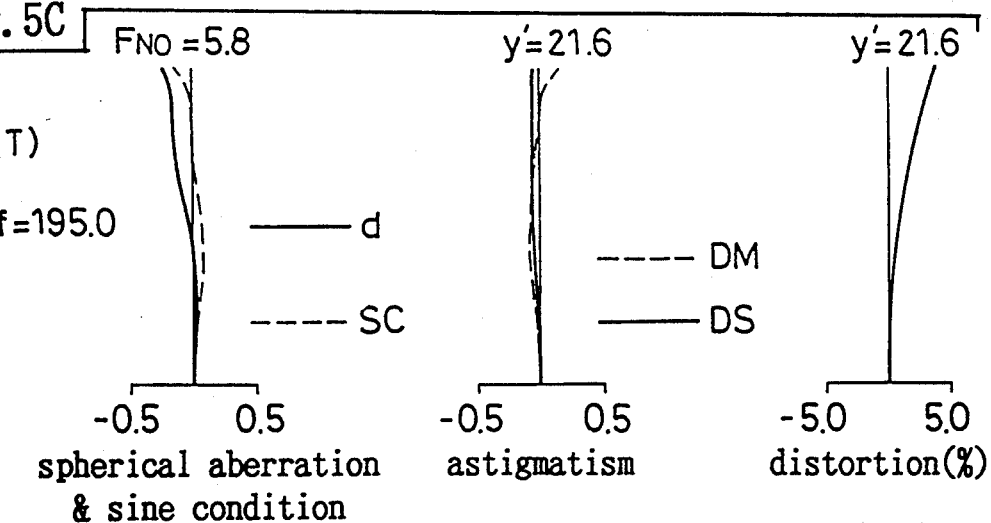
Figure 6A:
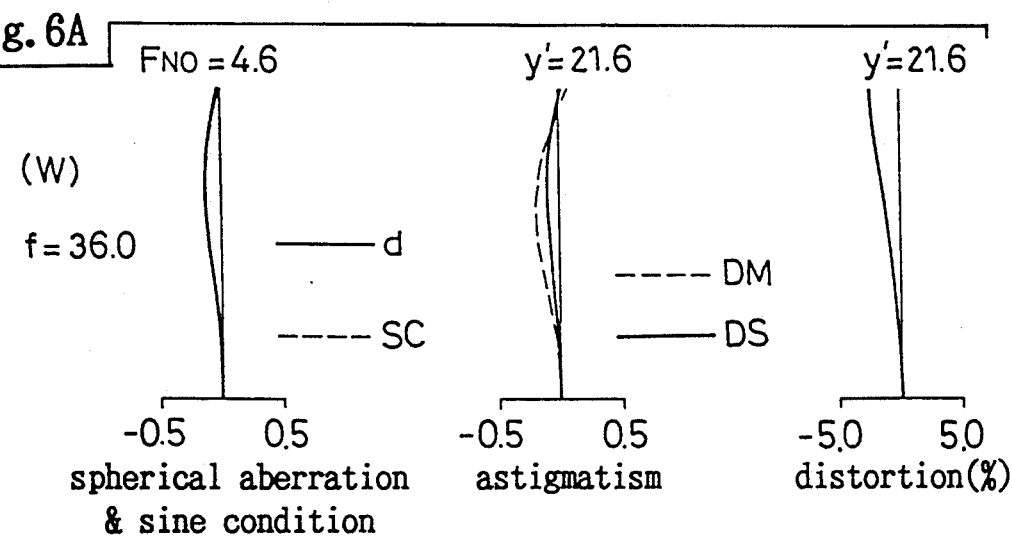
Figure 6B:
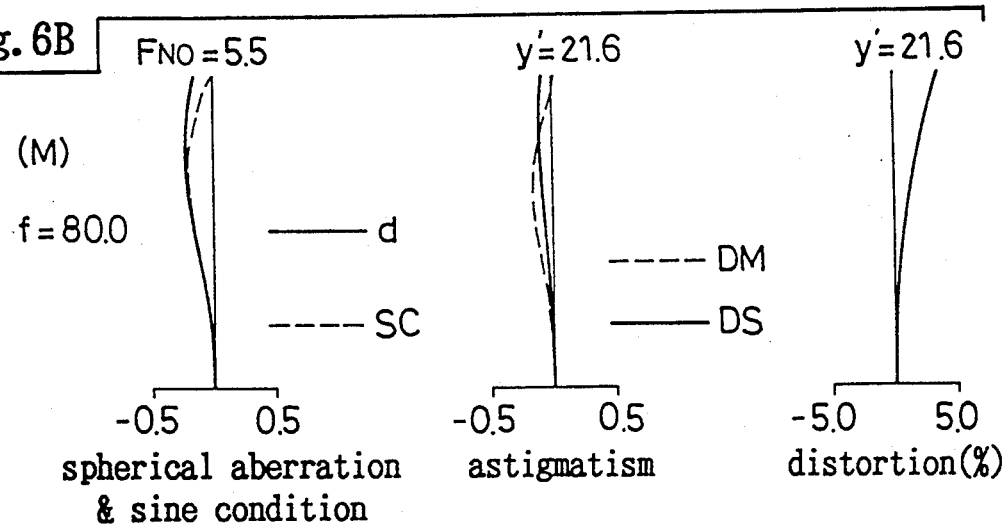
Figure 6C:
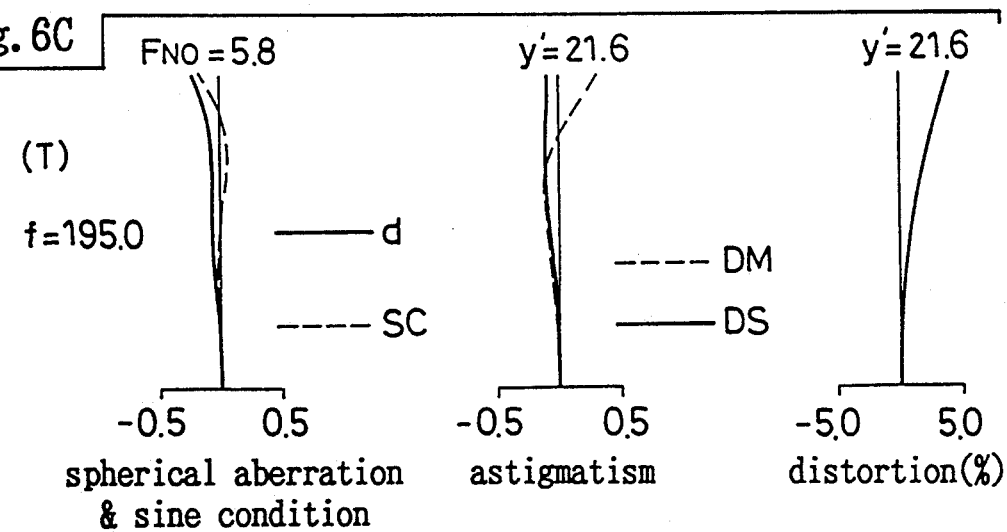
Figure 9A:
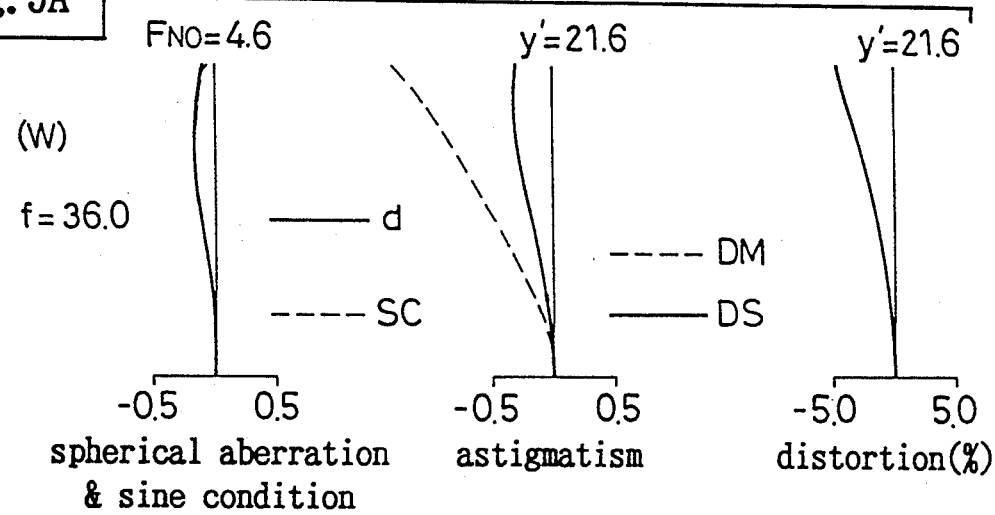
Figure 9B:
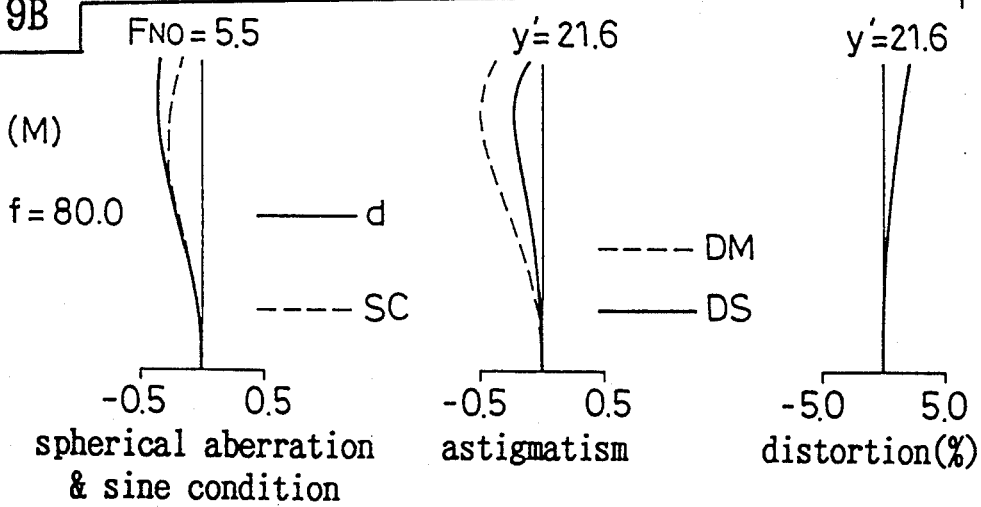
Figure 9C:
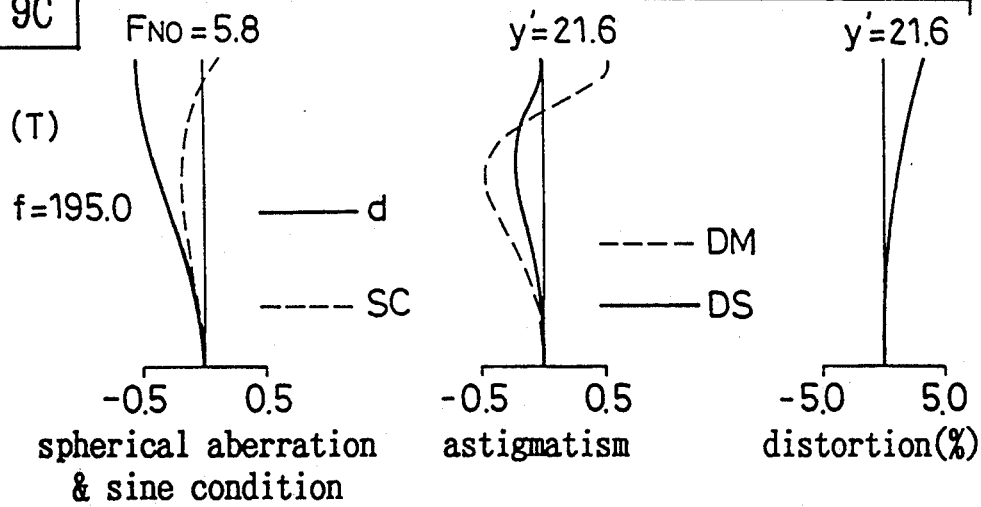

FIGS. 1 to 3 are cross-sectional views of optical systems of a first to third embodiments according to the present invention. In the figures, the arrows m1, m2, m3, m4 and m5 respectively show the movements of the first, second, third, fourth and fifth lens units I, II, III, IV and V from the shortest focal length condition (W) to the longest focal length condition (L), and A represents an aperture.

The first embodiment, shown in FIG. 1, comprises from the object side: a first lens unit I of positive refractive power having, from the object side, a negative meniscus lens element whose image side surface is concave, a positive biconvex lens element and a positive meniscus lens element whose object side surface is convex; a second lens unit II of negative refractive power having, from the object side, a negative meniscus lens element whose image side surface is concave, a positive meniscus lens element whose image side surface is convex, a negative biconcave lens element, a positive meniscus lens element whose object side surface is convex and a negative meniscus lens element whose object side surface is concave; a third lens unit III of positive refractive power having, from the object side, an aperture, a positive biconvex lens element, a positive meniscus lens element whose object side surface is convex, a positive meniscus lens element whose object side surface is convex and a negative meniscus lens element whose object side surface is concave; a fourth lens unit IV of positive refractive power having, from the object side, a positive biconvex lens element, a positive biconvex lens element, a negative meniscus lens element whose object side surface is concave, a negative biconcave lens element and a positive biconvex lens element; and a fifth lens unit V of negative refractive power having a negative meniscus lens element whose object side surface is concave. The object side surface of the third lens element, from the object side, of the fourth lens unit IV is aspheric.

The second and third embodiments, shown in FIGS. 2 and 3, respectively, comprise from the object side: a first lens unit I of positive refractive power having, from the object side, a negative meniscus lens element whose image side surface is concave, a positive lens element whose image side surface is convex and a positive meniscus lens element whose object side surface is convex; a second lens unit II of negative refractive power having, from the object side, a negative meniscus lens element whose image side surface is concave, a positive meniscus lens element whose image side surface is convex, a negative biconcave lens element, a positive biconvex lens element and a negative biconcave lens element; a third lens element III of positive refractive power having, from the object side, an aperture, a positive meniscus lens element whose object side surface is convex, a positive biconvex lens element, a positive biconvex lens element and a negative meniscus lens element whose object side surface is concave; a fourth lens unit IV of positive refractive power having, from the object side, a positive biconvex lens element, a positive biconvex lens element, a positive meniscus lens element whose image side surface is convex, a negative biconcave lens element and a positive biconvex lens element; and a fifth lens unit V of negative refractive power having a negative meniscus lens element whose object side surface is concave. The object side surface of the third lens element, from the object side, of the fourth lens unit IV is aspheric.

In each of the first to third embodiments, the third and fifth lens units III and V, which are linked to each other, integrally move in a zooming operation from a shortest to a longest focal length conditions. This is in order to simplify the lens barrel composition. Moreover, as shown in FIGS. 1 to 3, the third to fifth lens units III to integrally move toward the image side in a focusing operation from infinity to a near side.

FIGS. 4A, 4B and 4C to 6A, 6B and 6C respectively represent the curves of the aberrations, to the object point at infinity, of the first to third embodiments. FIGS. 7A, 7B and 7C to 9A, 9B and 9C respectively represent the curves of the aberrations, to the object point at the nearest position (at the minimum object distance), of the first to third embodiments. In each figure, (W) shows the aberrations in the shortest focal length condition, (M) shows the aberrations in the middle focal length condition, and (T) shows the aberrations in the longest focal length condition. The solid line d represents aberration to the d-line, and the dotted line SC represent sine condition. The dotted line DM and solid line DS respectively show astigmatisms on a meridional and sagittal image planes.

The following Tables 1 to 3 disclose, respectively, the first to third embodiments according to the present invention. In each Table:

$r_i$ (i=1,2,3, ...) represents a radius of curvature of an ith lens surface counted from the object side;

$d_i$ (i=1,2,3, ...) represents an axial distance of an ith lens surface counted from the object side;

$N_i$ (i=1,2,3, ...) and $v_i$ (i=1,2,3, ...) represent a refractive index and an Abbe number to the d-line of an ith lens surface, respectively;

f represents a focal length of the whole zoom lens system; and $F_{NO}$ represents a minimum F-number.

In each table, the minimum object distance and the movement amount (of the third to fifth lens units) in focusing are also shown.

Moreover, in Tables 1 to 3, the asterisk in the radius of curvature column indicates that the surface is aspheric and is defined by the following equation which represents a configuration of an aspheric surface:

$$X = [h^2/r]/[1+\{1-\epsilon\cdot(h/r)^2\}^{\frac{1}{2}}] + \Sigma_i A_i h^i$$

wherein:
X represents a shift amount from the reference lens surface along the optical axis;
r represents a reference radius of curvature;
h represents a height in a direction perpendicular to the optical axis;
$A_i$ represents an aspheric coefficient of the ith order; and
$\epsilon$ represents a conic constant.

Table 4 shows the values of $|f_2|/f_W$ of the condition (1) and the values of $|f_{3-5}|/(f_W \cdot f_T)^{\frac{1}{2}}$ of the condition (4) for the first to third embodiments.

Table 5 shows the values of $|f_5/f_4|$ of the condition (2) and the values of $e_{3T}/e_{3W}$ of the condition (3) for the first to third embodiments.

Table 6 shows the values of $\{(\beta_W^2-1)/(\beta_T^2-1)\}\cdot Z^2$ of the condition (6) for the first to third embodiment.

TABLE 1

<Embodiment 1>
$f = 28.8 \sim 80.0 \sim 195.0$   $F_{NO} = 4.1 \sim 5.5 \sim 5.8$

| | Radius of Curvature | | Axial Distance | | Refractive Index | | Abbe Number |
|---|---|---|---|---|---|---|---|
| $r_1$ | 142.009 | | | | | | |
| | | $d_1$ | 2.000 | $N_1$ | 1.84666 | $\nu_1$ | 23.82 |
| $r_2$ | 63.000 | | | | | | |
| | | $d_2$ | 9.000 | $N_2$ | 1.67000 | $\nu_2$ | 57.07 |
| $r_3$ | −421.628 | | | | | | |
| | | $d_3$ | 0.150 | | | | |
| $r_4$ | 42.081 | | | | | | |
| | | $d_4$ | 5.800 | $N_3$ | 1.61800 | $\nu_3$ | 63.39 |
| $r_5$ | 92.583 | | | | | | |
| | | $d_5$ | 0.600~23.788~38.538 | | | | |
| $r_6$ | 83.645 | | | | | | |
| | | $d_6$ | 1.200 | $N_4$ | 1.85000 | $\nu_4$ | 40.04 |
| $r_7$ | 15.000 | | | | | | |
| | | $d_7$ | 5.200 | | | | |
| $r_8$ | −243.241 | | | | | | |
| | | $d_8$ | 2.500 | $N_5$ | 1.79850 | $\nu_5$ | 22.60 |
| $r_9$ | −36.067 | | | | | | |
| | | $d_9$ | 1.100 | $N_6$ | 1.77250 | $\nu_6$ | 49.77 |
| $r_{10}$ | 27.207 | | | | | | |
| | | $d_{10}$ | 0.200 | | | | |
| $r_{11}$ | 21.566 | | | | | | |
| | | $d_{11}$ | 3.000 | $N_7$ | 1.75000 | $\nu_7$ | 25.14 |
| $r_{12}$ | 7429.417 | | | | | | |
| | | $d_{12}$ | 1.300 | | | | |
| $r_{13}$ | −24.041 | | | | | | |
| | | $d_{13}$ | 1.100 | $N_8$ | 1.75450 | $\nu_8$ | 51.57 |
| $r_{14}$ | −85.519 | | | | | | |
| | | $d_{14}$ | 19.650~9.411~0.800 | | | | |
| $r_{15}$ | ∞ (aperture) | | | | | | |
| | | $d_{15}$ | 1.000 | | | | |
| $r_{16}$ | 24.641 | | | | | | |
| | | $d_{16}$ | 3.000 | $N_9$ | 1.51728 | $\nu_9$ | 69.68 |
| $r_{17}$ | −105.581 | | | | | | |
| | | $d_{17}$ | 0.120 | | | | |
| $r_{18}$ | 39.937 | | | | | | |
| | | $d_{18}$ | 2.000 | $N_{10}$ | 1.51680 | $\nu_{10}$ | 64.20 |
| $r_{19}$ | 239.384 | | | | | | |
| | | $d_{19}$ | 0.120 | | | | |
| $r_{20}$ | 40.841 | | | | | | |
| | | $d_{20}$ | 2.500 | $N_{11}$ | 1.51823 | $\nu_{11}$ | 58.96 |
| $r_{21}$ | 197.755 | | | | | | |
| | | $d_{21}$ | 1.200 | | | | |
| $r_{22}$ | −36.971 | | | | | | |
| | | $d_{22}$ | 1.200 | $N_{12}$ | 1.84666 | $\nu_{12}$ | 23.82 |

TABLE 1-continued

| | | | | | | | |
|---|---|---|---|---|---|---|---|
| $r_{23}$ | −296.208 | | | | | | |
| | | $d_{23}$ | 4.800~1.300~0.800 | | | | |
| $r_{24}$ | 62.284 | | | | | | |
| | | $d_{24}$ | 2.000 | $N_{13}$ | 1.59551 | $\nu_{13}$ | 39.22 |
| $r_{25}$ | −214.492 | | | | | | |
| | | $d_{25}$ | 0.200 | | | | |
| $r_{26}$ | 74.062 | | | | | | |
| | | $d_{26}$ | 2.000 | $N_{14}$ | 1.51680 | $\nu_{14}$ | 64.20 |
| $r_{27}$ | −50.848 | | | | | | |
| | | $d_{27}$ | 3.000 | | | | |
| $r_{28}^*$ | −305.730 | | | | | | |
| | | $d_{28}$ | 0.035 | $N_{15}$ | 1.51790 | $\nu_{15}$ | 52.31 |
| $r_{29}$ | −305.730 | | | | | | |
| | | $d_{29}$ | 1.200 | $N_{16}$ | 1.83400 | $\nu_{16}$ | 37.05 |
| $r_{30}$ | 21.472 | | | | | | |
| | | $d_{30}$ | 1.000 | | | | |
| $r_{31}$ | 27.892 | | | | | | |
| | | $d_{31}$ | 3.000 | $N_{17}$ | 1.54072 | $\nu_{17}$ | 47.20 |
| $r_{32}$ | −44.997 | | | | | | |
| | | $d_{32}$ | 1.500~5.000~5.500 | | | | |
| $r_{33}$ | −26.770 | | | | | | |
| | | $d_{33}$ | 1.500 | $N_{18}$ | 1.58913 | $\nu_{18}$ | 61.11 |
| $r_{34}$ | −63.747 | | | | | | |
| | | $\Sigma d = 84.175 \sim 97.123 \sim 103.263$ | | | | | |

Aspheric coefficient $r_{28}: \epsilon = 1$
$A_4 = -0.42582 \times 10^{-4}$
$A_6 = -0.49696 \times 10^{-7}$
$A_8 = -0.77675 \times 10^{-9}$
$A_{10} = 0.44972 \times 10^{-11}$
$A_{12} = -0.32668 \times 10^{-14}$

| Focal Length (mm) | Nearest Object Distance (m) | Movement Amount in Focusing (mm) |
|---|---|---|
| 28.8 | 0.5 | 2.046 |
| 80.0 | 0.65 | 2.682 |
| 195.0 | 1.0 | 5.520 |

TABLE 2

<Embodiment 2>
$f = 36.0 \sim 80.0 \sim 195.0$   $F_{NO} = 4.1 \sim 5.5 \sim 5.8$

| | Radius of Curvature | | Axial Distance | | Refractive Index | | Abbe Number |
|---|---|---|---|---|---|---|---|
| $r_1$ | 85.463 | | | | | | |
| | | $d_1$ | 2.000 | $N_1$ | 1.84666 | $\nu_1$ | 23.82 |
| $r_2$ | 51.495 | | | | | | |
| | | $d_2$ | 8.000 | $N_2$ | 1.58913 | $\nu_2$ | 61.11 |
| $r_3$ | 536.311 | | | | | | |
| | | $d_3$ | 0.150 | | | | |
| $r_4$ | 45.631 | | | | | | |
| | | $d_4$ | 6.500 | $N_3$ | 1.51680 | $\nu_3$ | 64.20 |
| $r_5$ | 177.943 | | | | | | |
| | | $d_5$ | 0.550~20.852~37.029 | | | | |
| $r_6$ | 76.313 | | | | | | |
| | | $d_6$ | 1.200 | $N_4$ | 1.85000 | $\nu_4$ | 40.04 |
| $r_7$ | 17.000 | | | | | | |
| | | $d_7$ | 5.200 | | | | |
| $r_8$ | −178.894 | | | | | | |
| | | $d_8$ | 2.500 | $N_5$ | 1.80518 | $\nu_5$ | 25.43 |
| $r_9$ | −35.000 | | | | | | |
| | | $d_9$ | 1.200 | $N_6$ | 1.77250 | $\nu_6$ | 49.77 |
| $r_{10}$ | 46.085 | | | | | | |
| | | $d_{10}$ | 1.500 | | | | |
| $r_{11}$ | 24.826 | | | | | | |
| | | $d_{11}$ | 3.000 | $N_7$ | 1.76182 | $\nu_7$ | 26.55 |
| $r_{12}$ | −303.936 | | | | | | |
| | | $d_{12}$ | 2.300 | | | | |
| $r_{13}$ | −30.895 | | | | | | |
| | | $d_{13}$ | 1.200 | $N_8$ | 1.75450 | $\nu_8$ | 51.57 |
| $r_{14}$ | 112.326 | | | | | | |
| | | $d_{14}$ | 20.201~11.632~2.000 | | | | |
| $r_{15}$ | ∞ (aperture) | | | | | | |
| | | $d_{15}$ | 1.250 | | | | |
| $r_{16}$ | 40.665 | | | | | | |
| | | $d_{16}$ | 2.500 | $N_9$ | 1.51680 | $\nu_9$ | 64.20 |
| $r_{17}$ | 610.571 | | | | | | |
| | | $d_{17}$ | 0.100 | | | | |
| $r_{18}$ | 39.382 | | | | | | |
| | | $d_{18}$ | 3.000 | $N_{10}$ | 1.51823 | $\nu_{10}$ | 58.96 |

TABLE 2-continued

| | Radius | | | | | | |
|---|---|---|---|---|---|---|---|
| $r_{19}$ | −126.133 | | | | | | |
| | | $d_{19}$ | 0.150 | | | | |
| $r_{20}$ | 49.872 | | | | | | |
| | | $d_{20}$ | 2.800 | $N_{11}$ | 1.51680 | $\nu_{11}$ | 64.20 |
| $r_{21}$ | −96.818 | | | | | | |
| | | $d_{21}$ | 2.500 | | | | |
| $r_{22}$ | −31.491 | | | | | | |
| | | $d_{22}$ | 1.200 | $N_{12}$ | 1.84666 | $\nu_{12}$ | 23.82 |
| $r_{23}$ | −430.697 | | | | | | |
| | | $d_{23}$ | 5.300~2.000~1.500 | | | | |
| $r_{24}$ | 48.450 | | | | | | |
| | | $d_{24}$ | 2.800 | $N_{13}$ | 1.51823 | $\nu_{13}$ | 58.96 |
| $r_{25}$ | −51.722 | | | | | | |
| | | $d_{25}$ | 0.150 | | | | |
| $r_{26}$ | 90.679 | | | | | | |
| | | $d_{26}$ | 3.000 | $N_{14}$ | 1.51823 | $\nu_{14}$ | 58.96 |
| $r_{27}$ | −40.658 | | | | | | |
| | | $d_{27}$ | 3.750 | | | | |
| $r_{28}^{*}$ | −85.000 | | | | | | |
| | | $d_{28}$ | 0.035 | $N_{15}$ | 1.51790 | $\nu_{15}$ | 52.31 |
| $r_{29}$ | −80.000 | | | | | | |
| | | $d_{29}$ | 1.400 | $N_{16}$ | 1.85000 | $\nu_{16}$ | 40.04 |
| $r_{30}$ | 28.212 | | | | | | |
| | | $d_{30}$ | 1.200 | | | | |
| $r_{31}$ | 45.371 | | | | | | |
| | | $d_{31}$ | 3.000 | $N_{17}$ | 1.67339 | $\nu_{17}$ | 29.25 |
| $r_{32}$ | −213.740 | | | | | | |
| | | $d_{32}$ | 2.000~5.3000~5.800 | | | | |
| $r_{33}$ | −47.330 | | | | | | |
| | | $d_{33}$ | 1.880 | $N_{18}$ | 1.67000 | $\nu_{18}$ | 57.07 |
| $r_{34}$ | −293.932 | | | | | | |
| | | $\Sigma d = 93.516~105.249~111.794$ | | | | | |

Aspheric coefficient $r_{28}: \epsilon = 1$
$A_4 = -0.44923 \times 10^{-4}$
$A_6 = 0.64353 \times 10^{-7}$
$A_8 = -0.33889 \times 10^{-8}$
$A_{10} = 0.46696 \times 10^{-10}$
$A_{12} = -0.23410 \times 10^{-12}$

| Focal Length (mm) | Nearest Object Distance (m) | Movement Amount in Focusing (mm) |
|---|---|---|
| 36.0 | 0.5 | 2.694 |
| 80.0 | 0.8 | 2.619 |
| 195.0 | 1.0 | 6.126 |

TABLE 3

<Embodiment 3>
$f = 36.0~80.0~195.0$   $F_{NO} = 4.6~5.5~5.8$

| | Radius of Curvature | | Axial Distance | | Refractive Index | | Abbe Number |
|---|---|---|---|---|---|---|---|
| $r_1$ | 85.376 | | | | | | |
| | | $d_1$ | 1.800 | $N_1$ | 1.84666 | $\nu_1$ | 23.82 |
| $r_2$ | 51.536 | | | | | | |
| | | $d_2$ | 8.200 | $N_2$ | 1.58913 | $\nu_2$ | 61.11 |
| $r_3$ | 532.110 | | | | | | |
| | | $d_3$ | 0.150 | | | | |
| $r_4$ | 45.991 | | | | | | |
| | | $d_4$ | 6.700 | $N_3$ | 1.51680 | $\nu_3$ | 64.20 |
| $r_5$ | 183.389 | | | | | | |
| | | $d_5$ | 0.550~20.404~36.813 | | | | |
| $r_6$ | 72.670 | | | | | | |
| | | $d_6$ | 1.200 | $N_4$ | 1.85000 | $\nu_4$ | 40.04 |
| $r_7$ | 17.000 | | | | | | |
| | | $d_7$ | 5.200 | | | | |
| $r_8$ | −284.797 | | | | | | |
| | | $d_8$ | 2.700 | $N_5$ | 1.75000 | $\nu_5$ | 25.14 |
| $r_9$ | −34.500 | | | | | | |
| | | $d_9$ | 1.200 | $N_6$ | 1.77250 | $\nu_6$ | 49.77 |
| $r_{10}$ | 44.093 | | | | | | |
| | | $d_{10}$ | 1.500 | | | | |
| $r_{11}$ | 24.969 | | | | | | |
| | | $d_{11}$ | 3.100 | $N_7$ | 1.76182 | $\nu_7$ | 26.55 |
| $r_{12}$ | −423.979 | | | | | | |
| | | $d_{12}$ | 1.800 | | | | |
| $r_{13}$ | −30.323 | | | | | | |
| | | $d_{13}$ | 1.200 | $N_8$ | 1.75450 | $\nu_8$ | 51.57 |
| $r_{14}$ | 138.637 | | | | | | |
| | | $d_{14}$ | 20.268~11.499~2.000 | | | | |

TABLE 3-continued

| | | | | | | | |
|---|---|---|---|---|---|---|---|
| $r_{15}$ | ∞ (aperture) | | | | | | |
| | | $d_{15}$ | 1.250 | | | | |
| $r_{16}$ | 44.821 | | | | | | |
| | | $d_{16}$ | 2.500 | $N_9$ | 1.51680 | $\nu_9$ | 64.20 |
| $r_{17}$ | 721.095 | | | | | | |
| | | $d_{17}$ | 0.100 | | | | |
| $r_{18}$ | 39.749 | | | | | | |
| | | $d_{18}$ | 3.200 | $N_{10}$ | 1.51823 | $\nu_{10}$ | 58.96 |
| $r_{19}$ | −140.394 | | | | | | |
| | | $d_{19}$ | 0.150 | | | | |
| $r_{20}$ | 46.151 | | | | | | |
| | | $d_{20}$ | 2.800 | $N_{11}$ | 1.51680 | $\nu_{11}$ | 64.20 |
| $r_{21}$ | −88.895 | | | | | | |
| | | $d_{21}$ | 2.500 | | | | |
| $r_{22}$ | −31.515 | | | | | | |
| | | $d_{22}$ | 1.200 | $N_{12}$ | 1.84666 | $\nu_{12}$ | 23.82 |
| $r_{23}$ | −339.268 | | | | | | |
| | | $d_{23}$ | 5.300~1.950~1.500 | | | | |
| $r_{24}$ | 45.729 | | | | | | |
| | | $d_{24}$ | 3.400 | $N_{13}$ | 1.51823 | $\nu_{13}$ | 58.96 |
| $r_{25}$ | −45.729 | | | | | | |
| | | $d_{25}$ | 0.150 | | | | |
| $r_{26}$ | 95.302 | | | | | | |
| | | $d_{26}$ | 3.000 | $N_{14}$ | 1.51823 | $\nu_{14}$ | 58.96 |
| $r_{27}$ | −44.311 | | | | | | |
| | | $d_{27}$ | 3.750 | | | | |
| $r_{28}^{*}$ | −85.000 | | | | | | |
| | | $d_{28}$ | 0.035 | $N_{15}$ | 1.51790 | $\nu_{15}$ | 52.31 |
| $r_{29}$ | −65.000 | | | | | | |
| | | $d_{29}$ | 1.400 | $N_{16}$ | 1.85000 | $\nu_{16}$ | 40.04 |
| $r_{30}$ | 29.138 | | | | | | |
| | | $d_{30}$ | 1.200 | | | | |
| $r_{31}$ | 52.452 | | | | | | |
| | | $d_{31}$ | 3.000 | $N_{17}$ | 1.67339 | $\nu_{10}$ | 29.25 |
| $r_{32}$ | −128.957 | | | | | | |
| | | $d_{32}$ | 2.000~5.350~5.800 | | | | |
| $r_{33}$ | −43.284 | | | | | | |
| | | $d_{33}$ | 1.880 | $N_{18}$ | 1.67000 | $\nu_{10}$ | 57.07 |
| $r_{34}$ | −362.975 | | | | | | |
| | | $\Sigma d = 94.383~105.468~112.378$ | | | | | |

Aspheric coefficient $r_{28}: \epsilon = 1$
$A_4 = -0.44131 \times 10^{-4}$
$A_6 = -0.31599 \times 10^{-7}$
$A_8 = -0.16773 \times 10^{-8}$
$A_{10} = 0.46907 \times 10^{-10}$
$A_{12} = -0.39101 \times 10^{-12}$

| Focal Length (mm) | Nearest Object Distance (m) | Movement Amount in Focusing (mm) |
|---|---|---|
| 36.0 | 0.5 | 2.706 |
| 80.0 | 0.8 | 2.542 |
| 195.0 | 1.0 | 6.000 |

TABLE 4

Conditions (1) and (4)

| | $|f^2|/f_w$ | $|f_{3-5}|/(f_w \cdot f_t)^{\frac{1}{2}}$ |
|---|---|---|
| Embodiment 1 | 0.476 | 0.319~0.347 |
| Embodiment 2 | 0.434 | 0.300~0.324 |
| Embodiment 3 | 0.434 | 0.296~0.321 |

TABLE 5

Conditions (2) and (3)

| | $|f_5|/f_4$ | $e_{3T}/e_{3W}$ |
|---|---|---|
| Embodiment 1 | 1.604 | 3.667 |
| Embodiment 2 | 1.723 | 3.533 |
| Embodiment 3 | 1.549 | 3.533 |

TABLE 6

Condition (6)
$(\beta_W^2 - 1) \cdot Z^2/(\beta_T^2 - 1)$

| | |
|---|---|
| Embodiment 1 | 7.96 |
| Embodiment 2 | 6.59 |

TABLE 6-continued

| | Condition (6) $(\beta_W^2 - 1) \cdot Z^2/(\beta_T^2 - 1)$ |
|---|---|
| Embodiment 3 | 6.42 |

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be constructed as being included therein.

What is claimed is:

1. A zoom lens system, comprising from the object side:
   a first lens unit of positive refractive power, and shiftable towards the object side in a zooming operation from a shortest focal length condition to a longest focal length condition;
   a second lens unit of negative refractive power;
   a third lens unit of positive refractive power, and shiftable towards the object side in the zooming operation from the shortest focal length condition to the longest focal length condition;
   a fourth lens unit of positive refractive power, and shiftable towards the object side in the zooming operation from the shortest focal length condition to the longest focal length condition; and
   a fifth lens unit of negative refractive power; and wherein said zoom lens system fulfills the following conditions:

$$0.4 < |f_2 5 1|/f_W < 0.5$$

$$1.0 < |f_5|/f_4 < 5.0$$

$$2.5 < e_{3T}/e_{3W} < 4.5$$

wherein:
   $f_2$ represents a focal length of the second lens unit;
   $f_4$ represents a focal length of the fourth lens unit;
   $f_5$ represents a focal length of the fifth lens unit;
   $f_W$ represents a focal length of the whole lens system in the shortest focal length condition;
   $e_{3T}$ represents an axial distance between the third lens unit and the fourth lens unit in the longest focal length condition; and
   $e_{3W}$ represents an axial distance between the third lens unit and the fourth lens unit in the shortest focal length condition.

2. A zoom lens system as claimed in claim 1, wherein the third, fourth and fifth lens units are integrally shiftable towards the image side in a focusing operation from an infinity focusing condition to a nearest focusing condition.

3. A zoom lens system as claimed in claim 2, wherein said zoom lens system further fulfills the following condition:

$$0.25 < |f_{3-5}|/(f_W f_T)^{\frac{1}{2}} < 0.37$$

wherein:
   $f_{3-5}$ represents a compound focal length of the third, fourth, and fifth lens units; and
   $f_T$ represents a focal length of the whole lens system in the longest focal length condition.

4. A zoom lens system as claimed in claim 3, wherein said fourth lens unit has at least one aspheric surface, and said aspheric surface fulfills the following condition:

$$d\phi dH < 0$$

wherein:
   $d\phi$ represents a partial deviation of refractive power at a height (H) in the aspheric surface.

5. A zoom lens system as claimed in claim 2, wherein said zoom lens system further fulfills the following condition:

$$4.0 < \{(\beta_W^2 - 1)/(\beta_T^2 - 1)\} \cdot Z^2 < 9.0$$

wherein:
   $\beta_W$ represents a compound magnification of the third, fourth, and fifth lens units in the shortest focal length condition;
   $\beta_T$ represents a compound magnification of the third, fourth, and fifth lens units in the longest focal length condition; and
   Z represents a zoom ratio defined as $Z = f_W/f_T$.

6. A zoom lens system as claimed in claim 1, wherein said fourth lens unit comprises from the object side, a positive lens element, a positive lens element, a negative biconcave lens element, and a positive lens element, and has at least one aspheric surface.

7. A zoom lens system as claimed in claim 6, wherein said aspheric surface fulfills the following condition:

$$d\phi/dH < 0$$

wherein:
   $d\phi/dH$ represents a partial deviation of refractive power at a height (H) in the aspheric surface.

8. A zoom lens system as claimed in claim 6, wherein said fifth lens unit consists of a negative meniscus lens element convex to the image side.

9. A zoom lens system as claimed in claim 8, wherein the third, fourth and fifth lens units are integrally shiftable towards the image side in a focusing operation from an infinity focusing condition to a nearest focusing condition.

10. A zoom lens system, comprising from the object side:
    a first lens unit of positive refractive power, and shiftable towards the object side in a zooming operation from a shortest focal length condition to a longest focal length condition;
    a second lens unit of negative refractive power;
    a third lens unit of positive refractive power, and shiftable towards the object side in the zooming operation from the shortest focal length condition to the longest focal length condition;
    a fourth lens unit of positive refractive power, and shiftable towards the object side in the zooming operation from the shortest focal length condition to the longest focal length condition, said fourth lens unit being comprising of from the object side, a positive lens element, a positive lens element, a negative biconcave lens element, and a positive lens element, and having at least one aspheric surface; and
    a fifth lens unit of negative refractive power.

11. A zoom lens system as claimed in claim 10, wherein said aspheric surface fulfills the following condition:

$$d\phi/dH < 0$$

wherein:
  $d\phi/dH$ represents a partial deviation of refractive power at a height (H) in the aspheric surface.

12. A zoom lens system as claimed in claim 10, wherein said fifth lens unit consists of a negative meniscus lens element convex to the image side.

13. A zoom lens system as claimed in claim 12, wherein the third, fourth and fifth lens units are integrally shiftable towards the image side in a focusing operation from an infinity condition to a nearest focusing condition.

14. A zoom lens system, comprising from the object side:
  a first lens unit of positive refractive power, and shiftable towards the object side in a zooming operation from a shortest focal length condition to a longest focal length condition;
  a second lens unit of negative refractive power;
  a third lens unit of positive refractive power, and shiftable towards the object side in the zooming operation from the shortest focal length condition to the longest focal length condition;
  a fourth lens unit of positive refractive power, and shiftable towards the object side in the zooming operation from the shortest focal length condition to the longest focal length condition; and
  a fifth lens unit of negative refractive power; and wherein said the third, fourth and fifth lens units are integrally shiftable towards the image side in a focusing operation from an infinity focusing condition to a nearest focusing condition.

15. A zoom lens system as claimed in claim 14, wherein said zoom lens system further fulfills the following condition:

$$0.25 < |f_{3-5}|/(f_W \cdot f_T)^{\frac{1}{2}} < 0.37$$

$$4.0 < \{(\beta_W^2 - 1)/(\beta_T^2 - 1)\} \cdot Z^2 < 9.0$$

wherein:
  $f_{3-5}$ represents a compound focal length of the third, fourth, and fifth lens units;
  $f_T$ represents a focal length of the whole lens system in the longest focal length condition;
  $\beta_W$ represents a compound magnification of the third, fourth, and fifth lens units in the shortest focal length condition;
  $\beta_T$ represents a compound magnification of the third, fourth, and fifth lens units in the longest focal length condition; and
  Z represents a zoom ratio defined as $Z = f_W/f_T$.

16. A zoom lens system, comprising from the object side:
  a first lens unit of positive refractive power, and shiftable towards the object side in a zooming operation from a shortest focal length condition to a longest focal length condition;
  a second lens unit of negative refractive power;
  a third lens unit of positive refractive power, and shiftable towards the object side in the zooming operation from the shortest focal length condition to the longest focal length condition;
  a fourth lens unit of positive refractive power, and shiftable towards the object side in the zooming operation from the shortest focal length condition to the longest focal length condition, said fourth lens unit being comprising of from the object side, a positive lens element, a positive lens element, a negative biconcave lens element, and a positive lens element; and
  a fifth lens unit of negative refractive power; and wherein said the third, fourth and fifth lens units are integrally shiftable towards the image side in a focusing operation from an infinity focusing condition to a nearest focusing condition.

17. A zoom lens system as claimed in claim 16, wherein said zoom lens system further fulfills the following condition:

$$0.4 < |f_2|/f_W < 0.5$$

wherein:
  $f_2$ represents a focal length of the second lens unit; and
  $f_W$ represents a focal length of the whole lens system in the shortest focal length condition.

18. A zoom lens system as claimed in claim 16, wherein said zoom lens system further fulfills the following condition:

$$1.0 < |f_5|/f_4 < 5.0$$

wherein:
  $f_4$ represents a focal length of the fourth lens unit; and
  $f_5$ represents a focal length of the fifth lens unit.

19. A zoom lens system as claimed in claim 16, wherein said zoom lens system further fulfills the following condition:

$$2.5 < e_{3T}/e_{3W} < 4.5$$

wherein:
  $e_{3T}$ represents an axial distance between the third lens unit and the fourth lens unit in the longest focal length condition; and
  $e_{3W}$ represents an axial distance between the third lens unit and the fourth lens unit in the shortest focal length condition.

20. A zoom lens system as claimed in claim 16, wherein said zoom lens system further fulfills the following condition:

$$0.25 < |f_{3-5}|/(f_W \cdot f_T)^{\frac{1}{2}} < 0.37$$

wherein:
  $f_{3-5}$ represents a compound focal length of the third, fourth, and fifth lens units;
  $f_W$ represents a focal length of the whole lens system in the shortest focal length condition; and
  $f_T$ represents a focal length of the whole lens system in the longest focal length condition.

21. A zoom lens system as claimed in claim 16, wherein said zoom lens system further fulfills the following condition:

$$4.0 < \{(\beta_W^2 - 1)/(\beta_T^2 - 1)\} \cdot Z^2 < 9.0$$

wherein:
  $\beta_W$ represents a compound magnification of the third, fourth, and fifth lens units in the shortest focal length condition;

$\beta_T$ represents a compound magnification of the third, fourth, and fifth lens units in the longest focal length condition; and Z represents a zoom ratio defined as $Z = f_W/f_T$, wherein: $f_W$ represents a focal length of the whole lens system in the shortest focal length condition; and $f_T$ represents a focal length of the whole lens system in the longest focal length condition.

* * * * *